United States Patent
Zhou et al.

(10) Patent No.: US 9,484,833 B2
(45) Date of Patent: Nov. 1, 2016

(54) SYSTEM AND METHOD FOR CONTROLLING PCS VOLTAGE AND FREQUENCY

(71) Applicants: STATE GRID CORPORATION OF CHINA, Beijing (CN); XUANCHENG POWER SUPPLY COMPANY OF STATE GRID ANHUI ELECTRIC POWER CORPORATION, Anhui (CN); BEIJING HUA TENG KAI YUAN ELECTRIC COMPANY LIMITED, Beijing (CN)

(72) Inventors: Yeru Zhou, Anhui (CN); Jian Wang, Anhui (CN); Dongsheng Fu, Anhui (CN); Xiaoma Jin, Anhui (CN); Dongsheng Zou, Anhui (CN); Jin Pan, Anhui (CN); Yi Song, Anhui (CN); Jianzhou Cheng, Anhui (CN); Tianwen Zheng, Anhui (CN); Jianming Wu, Anhui (CN); Hongbo Luo, Anhui (CN)

(73) Assignees: State Grid Corporation of China, Beijing (CN); Xuancheng Power Supply Company of State Grid Anhui Electric Power Corporation, Xuancheng (CN); Beijing Hua Teng Kai Yuan Electric Company Limited, Beijing (CN)

( * ) Notice: Subject to any disclaimer, the term of this patent is extended or adjusted under 35 U.S.C. 154(b) by 0 days.

(21) Appl. No.: 14/772,377

(22) PCT Filed: Dec. 24, 2013

(86) PCT No.: PCT/CN2013/001631
§ 371 (c)(1),
(2) Date: Sep. 2, 2015

(87) PCT Pub. No.: WO2014/134763
PCT Pub. Date: Sep. 12, 2014

(65) Prior Publication Data
US 2016/0006364 A1 Jan. 7, 2016

(30) Foreign Application Priority Data

Mar. 4, 2013 (CN) .......................... 2013 1 0066978

(51) Int. Cl.
| H02M 5/42 | (2006.01) |
| H02M 7/217 | (2006.01) |
| H02J 3/01 | (2006.01) |
| H02J 3/18 | (2006.01) |
| H02M 7/797 | (2006.01) |
| H02M 7/5387 | (2007.01) |

(52) U.S. Cl.
CPC .............. *H02M 7/217* (2013.01); *H02J 3/01* (2013.01); *H02J 3/1807* (2013.01); *H02M 7/797* (2013.01); *H02M 2007/53876* (2013.01); *Y02E 40/30* (2013.01); *Y02E 40/40* (2013.01)

(58) Field of Classification Search
CPC .............. H02M 1/12; H02M 3/3155; H02M 3/33507; H02M 3/33546; H02M 7/1557; H02M 7/1626; G05F 1/30
USPC ................... 363/74, 78, 84, 88–89, 123–127
See application file for complete search history.

(56) References Cited

U.S. PATENT DOCUMENTS

2009/0244937 A1* 10/2009 Liu ..................... H02M 1/4216
363/46

FOREIGN PATENT DOCUMENTS

| CN | 101944745 A | 1/2011 |
| CN | 102891500 A | 1/2013 |
| CN | 203071592 U | 7/2013 |

OTHER PUBLICATIONS

Miao, Shang; Research of power storage system using super capacitor; Chinese Selected Master's Theses Full-Text Databases(CMFD); Mar. 15, 2006; 56 pages.

*Primary Examiner* — Adolf Berhane
*Assistant Examiner* — Afework Demisse
(74) *Attorney, Agent, or Firm* — Thorpe North & Western, LLP

(57) ABSTRACT

The present invention discloses a system and a method for controlling PCS voltage and frequency, wherein the system comprises a reference voltage converter, a phase-locked loop, a grid-side voltage converter, a voltage transformer, a first proportional integral controller, a second proportional integral controller, a coordinate converter and a SVPWM generator; a reference voltage converter is connected to an output terminal of a the phase-locked loop, and the output terminal of the phase-locked loop is further connected to a grid-side voltage converter; the grid-side voltage converter is connected to a high-voltage side of an isolating transformer of the electric grid via the voltage transformer; two output terminals of the grid-side voltage converter are respectively connected to the coordinate converter via two proportional integral controllers; an output terminal of the coordinate converter is connected to the SVPWM generator; an output terminal of the SVPWM generator is connected to a power switch of the electric grid. A PWM control signal for controlling the power switch of the electric grid is generated by the reference voltage converter, the phase-locked loop, the grid-side voltage converter, the voltage transformer, the two proportional integral controllers, the coordinate converter and the SVPWM generator. The system and method for controlling PCS voltage and frequency according to the invention have the advantages that the PCS can realize voltage and frequency buildup in an off-grid state and can stably output an expected voltage and frequency.

2 Claims, 5 Drawing Sheets

__US 9,484,833 B2__

SYSTEM AND METHOD FOR CONTROLLING PCS VOLTAGE AND FREQUENCY

FIELD OF THE INVENTION

The present invention relates to a system and method for controlling PCS voltage and frequency.

BACKGROUND OF THE INVENTION

It is well known that the connection, transmission and distribution technologies for the intermittent power sources such as wind energy and solar energy have become one of the preferred developing subjects in the current energy source field. Accordingly, the application of a battery energy storage system has gained wide attentions. An important component of the battery energy storage system is a power conversion system (PCS). The PCS has been widely applied in the distributed power generation technology such as solar energy and wind energy, and it has been gradually applied in the small-capacity two-way power transferring energy storage system. By means of the PCS, a two-way energy transfer between a DC battery of a battery energy storage system and an AC electric grid may be realized, so that the voltage control in the normal or island operation mode may be realized. An important role of the PCS is to, in the case that the electric grid is in outage, continue to provide a reliable voltage support to a load to meet the operation requirement of the load. Therefore, the study on the voltage and frequency control of the PCS becomes imperative under the situation.

The main object of controlling PCS voltage and frequency is to provide an expected voltage in an off-grid state. For a traditional PCS including a single-inductor filter, although its structure is simple, the filtering effect is poor. For a PCS including an LCL filter, the filtering effect is better than the above traditional PCS, but in the case of large capacity, it requires a high DC-side voltage, which is adverse to the series/parallel connection of the DC-side battery components.

As a power conversion system, the PCS may realize energy storage and the two-way energy flow between the electric grid and the load. In order to improve the output performance of the PCS, the existing PCS often includes an LCL-type filter or an isolating transformer. Thus, the mathematical model of the PCS will become a high-order model. When the traditional voltage-current double closed-loop control is employed, not only more voltage-current sensors are required, but also the number of PI controllers (proportional integral controllers) is increased. Thus, it is difficult to debug and inconvenient for engineering application.

SUMMARY OF THE INVENTION

In order to avoid the disadvantages existing in the above prior art, the invention provides a system and method for controlling PCS voltage and frequency to simplify the control strategy and the control structure and to control the PCS to stably output an expected constant or variable voltage and frequency so as to meet the engineering requirements.

The invention employs the following technical solutions to solve the technical problem.

A system for controlling PCS voltage and frequency comprises a reference voltage converter, a phase-locked loop, a grid-side voltage converter, a voltage transformer, a first proportional integral controller, a second proportional integral controller, a coordinate converter and a space vector pulse width modulation (SVPWM) generator. The reference voltage converter is connected to an output terminal of the phase-locked loop, and the output terminal of the phase-locked loop is further connected to the grid-side voltage converter; the grid-side voltage converter is connected at a high-voltage side of an isolating transformer of the electric grid via the voltage transformer; two output terminals of the grid-side voltage converter are connected to the coordinate converter via the first proportional integral controller and the second proportional integral controller respectively; an output terminal of the reference voltage converter is connected between the grid-side voltage converter and the first proportional integral controller, and the other output terminal of the reference voltage converter is connected between the grid-side voltage converter and the second proportional integral controller; an output terminal of the coordinate converter is connected to the SVPWM generator; an output terminal of the SVPWM generator is connected to a power switch of the electric grid.

The invention further provides a control method of the system for controlling PCS voltage and frequency.

The method for controlling PCS voltage and frequency comprises the following steps:

step 1: performing model reduction;

step 2: generating expected three-phase voltages Varef, Vbref and Vcref as reference voltages;

step 3: collecting three-phase voltages Va, Vb and Vc at a high-voltage side of an isolating transformer T of the electric grid in real time;

step 4: acquiring a phase $\theta$ of the reference voltage;

step 5: performing coordinate conversion on Varef, Vbref, Vcref and Va, Vb, Vc, and converting AC components a, b and c into DC components d and q to obtain a d-axis component Vdref and a q-axis component Vqref of the reference voltage and a d-axis component Vd and a q-axis component Vq of a sampled voltage;

step 6: controlling an outer loop voltage; inputting a difference obtained by subtracting Vd from Vdref of the step 5 into a first proportional integral controller, which outputs a parameter Vdr; inputting a difference obtained by subtracting Vq from Vqref of the step 5 into a second proportional integral controller, which outputs a parameter Vqr;

step 7: performing dq-$\alpha\beta$ coordinate conversion; performing dq-$\alpha\beta$ coordinate conversion on the parameters Vdr and Vqr obtained in the step 6, and converting two DC components d, q into two synchronously rotating AC components $\alpha$, $\beta$ to obtain voltages V$\alpha$ and V$\beta$ at an $\alpha\beta$ coordinate system;

step 8: performing SVPWM signal modulation; taking V$\alpha$ and V$\beta$ obtained in the step 7 as input signals of an SVPWM generator, and generating a PWM control signal for controlling a power switch of the electric grid by the SVPWM generator.

In comparison with the prior art, the present invention has the following beneficial effects.

In the system and method for controlling PCS voltage and frequency according to the invention, an LCR-type PCS topology is employed, which not only has a good filtering effect, but also lowers the requirement on the DC-side voltage. However, since the mathematical model of such a topology has a high order, if the voltage and current double closed-loop control is performed by strictly employing the mathematical model, not only the control difficulty will be increased, but also the control performance will be greatly decreased. Therefore, by employing a simplified and reliable method, the control performance and practical value may be apparently improved. In the method for controlling PCS voltage and frequency based on an LCR-T reduced model according to the invention, the high-order model is simplified by employing a voltage loop single-stage control strategy, thus the control structure becomes simple; by employing a single-stage voltage closed-loop control, the control strategy is further simplified. According to the invention, a good control performance is achieved: in the case that a fluctuation exists in the DC-side voltage, the PCS may be controlled to stably output the expected constant or variable voltage and frequency, and the constant or variable voltage and frequency may be output in real time, thus the PCS can realize voltage and frequency buildup in an off-grid state and can stably output the expected voltage and frequency, and therefore has the advantages of simple control, rapid dynamic response and high output voltage sinusoidal degree, completely meeting the engineering requirements.

The invention will be further illustrated by specific embodiments in conjunction with the drawings.

DETAILED DESCRIPTION OF THE EMBODIMENTS

Figure 1:
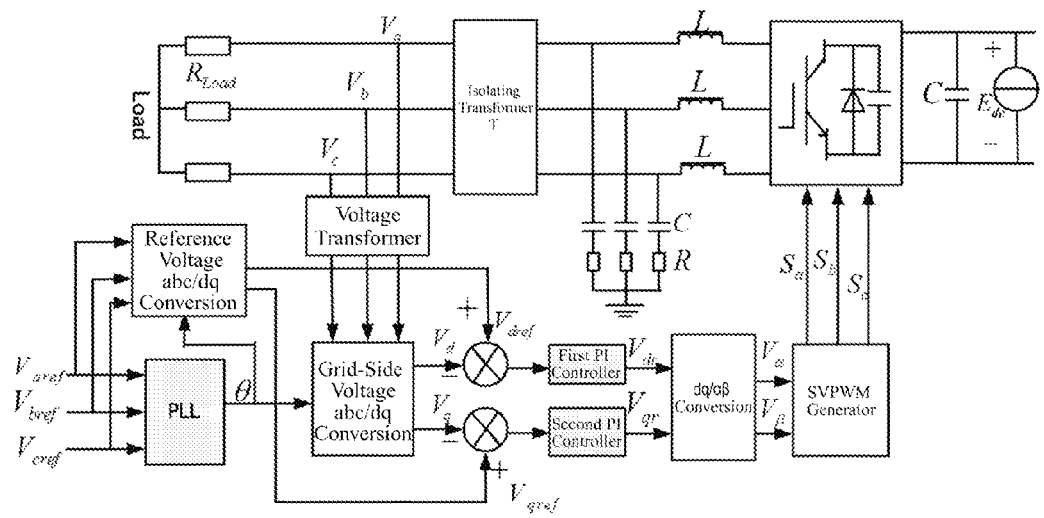
FIG. 1 is a structure diagram of a system for controlling PCS voltage and frequency according to the invention.
Figure 2:
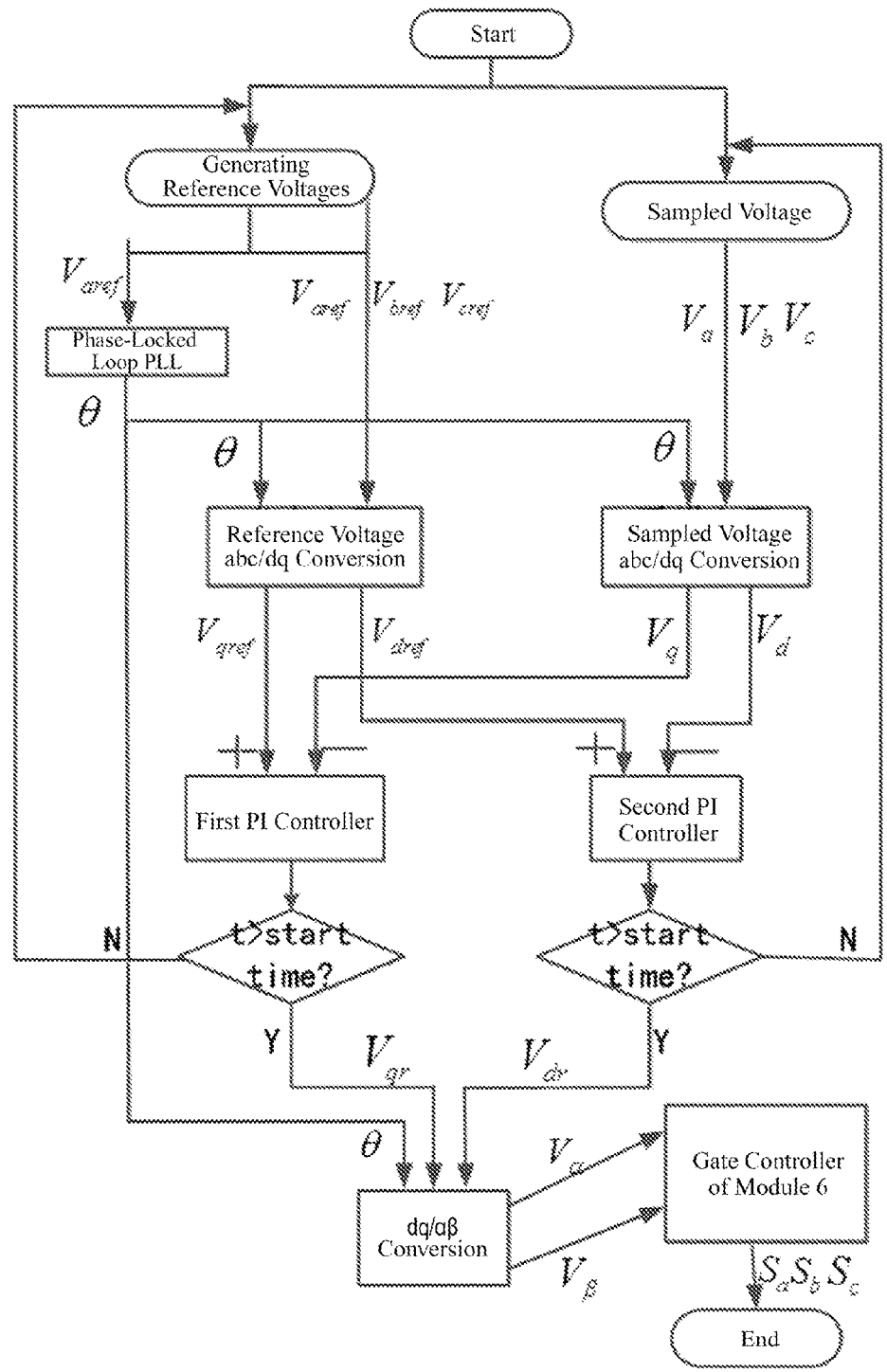
FIG. 2 is a flow chart of a method for controlling PCS voltage and frequency according to the invention.

Referring to FIG. 1, a system for controlling PCS voltage and frequency includes a reference voltage converter, a phase-locked loop, a grid-side voltage converter, a voltage transformer, a first proportional integral controller, a second proportional integral controller, a coordinate converter and an SVPWM generator. The reference voltage converter is connected to an output terminal of the phase-locked loop, and the output terminal of the phase-locked loop is further connected to the grid-side voltage converter. The grid-side voltage converter is connected to a high-voltage side of an isolating transformer of the electric grid via the voltage transformer. Two output terminals of the grid-side voltage converter are connected to the coordinate converter via the first proportional integral controller and the second proportional integral controller, respectively. An output terminal of the reference voltage converter is connected between the grid-side voltage converter and the first proportional integral controller, and the other output terminal of the reference voltage converter is connected between the grid-side voltage converter and the second proportional integral controller. An output terminal of the coordinate converter is connected to the SVPWM generator, and an output terminal of the SVPWM generator is connected to a power switch of the electric grid.

Three-phase reference voltages Varef, Vbref and Vcref are respectively input to the reference voltage converter and the phase-locked loop (PLL). The phase-locked loop is configured to track the phase of the reference voltage, acquire the phase θ of the reference voltage in real time, and transmit the phase θ to the reference voltage converter and the grid-side voltage converter respectively. According to the three-phase reference voltages Varef, Vbref and Vcref and the phase θ of the reference voltage transmitted by the phase-locked loop, the reference voltage converter calculates to obtain a d-axis component Vdref and a q-axis component Vqref of the reference voltage.

Both of the reference voltage converter and the grid-side voltage converter are abc/dq converters for converting three AC components a, b and c into two DC components d and q. The coordinate converter is a dq/αβ converter for transforming the two DC components d, q into two synchronously rotating AC components α and β.

According to the sampled voltages Va, Vb and Vc collected by the voltage transformer at the high-voltage side of the isolating transformer T of the electric grid and the phase θ of the reference voltage transmitted by the phase-locked loop, the grid-side voltage converter calculates to obtain a d-axis component Vd and a q-axis component Vq of the sampled voltage. The parameters Vdref and Vd are input to the first proportional integral controller, which outputs a parameter Vdr. The parameters Vqref and Vq are input to the second proportional integral controller, which outputs a parameter Vqr. Both of the parameters Vdr and Vqr are input to the coordinate converter, which converts the parameters Vdr and Vqr into parameters Vα and Vβ and transmits the parameters Vα and Vβ to the SVPWM generator as input signals of the SVPWM generator. The SVPWM generator employs a conventional two-level and seven-segment mode to generate a PWM control signal for controlling the power switch of the electric grid, thus controlling the PCS voltage and frequency.

A method for controlling PCS voltage and frequency includes the following steps.

Step 1: model reduction is performed. An LCR-T-type PCS refers to a power conversion system that includes an LCR filter and an isolating-type transformer. Generally, a model of the LCR-T-type PCS corresponds to a 5-order model, which is relatively difficult to be controlled. The mathematical nature of the model reduction is to perform pole-zero cancellation on the transfer function of the LCR-T-type PCS. The physical nature of the model reduction is as follows: under low-frequency signals, a filter capacitor branch and a magnetizing inductance branch are omitted and the original impedance network is replaced by equivalent inductances, that is, the sum of the filter inductance and the primary and secondary sides inductance of the isolating transformer is equivalent to a total inductance, thus the control may be simplified and a good control effect can be obtained. During the control process, however, the characteristics such as voltage/current value variations and voltage/current phase shifts caused by the isolating transformer, still need to be considered.

Step 2: desired three-phase voltages Varef, Vbref and Vcref are generated as reference voltages.

The reference voltages refer to the values of the three phases A, B, C that are expected to be output by the PCS, which are independent of the model reduction. They only represent the expected voltage values output by the PCS. The reference voltages have the characteristic as shown by formula (1):

$$\begin{cases} v_{aref} = mag * \cos(2\pi * fre) \\ v_{bref} = mag * \cos(2\pi * fre + 4\pi/3) \\ v_{cref} = mag * \cos(2\pi * fre + 2\pi/3) \end{cases} \quad (1)$$

where mag represents an amplitude value, and fre represents a frequency, both of which may be set as a constant value or a variable value. When a value having constant voltage and frequency is expected to be output, mag and fre may be set as constant values; when a variable value is expected to be output, mag or fre may be set as values that are varied according to a certain rule.

Step 3: three-phase voltages Va, Vb and Vc are collected at the high-voltage side of the isolating transformer T of the electric grid in real time, The voltage transformer is connected at the high-voltage side of the isolating transformer T of the electric grid, for collecting the sampled voltages Va, Vb and Vc from the electric grid and transmitting Va, Vb and Vc to the grid-side voltage converter.

Step 4: a phase θ of the reference voltage is acquired.

The phase θ of the reference voltage is tracked via the phase-locked loop (PLL) to acquire the phase information in real time, and the phase θ is provided to the reference voltage converter and the grid-side voltage converter for coordinate conversion.

Step 5: coordinate conversion is performed on Varef, Vbref, Vcref and Va, Vb, Vc, and AC components a, b and c are converted into DC components d and q to obtain a d-axis component Vdref and a q-axis component Vqref of the reference voltage and a d-axis component Vd and a q-axis component Vq of the sampled voltage.

The reference voltage converter performs abc/dq conversion on the three-phase reference voltages Varef, Vbref and Vcref to obtain a d-axis component Vdref and a q-axis component Vqref of the reference voltage. The grid-side voltage converter performs abc/dq conversion on the three-phase sampled voltages Va, Vb and Vc to obtain a d-axis component Vd and a q-axis component Vq of the sampled voltage.

The abc-dq conversion mainly transforms three AC components a, b, c into two DC components d, q to meet a mathematical relation as shown by formula (2):

$$\begin{bmatrix} d \\ q \end{bmatrix} = \frac{2}{3} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} a \\ b \\ c \end{bmatrix} \quad (2)$$

By means of the above formula (2), the abc-dq conversion is performed on the reference voltages Varef, Vbref, Vcref of step 2 to obtain a d-axis component Vdref and a q-axis component Vqref of the reference voltage, and the abc-dq conversion is performed on the sampled voltages Va, Vb, Vc of step 3 to obtain a d-axis component Vd and a q-axis component Vq of the sampled voltage.

Step 6: an outer loop voltage is controlled. A difference obtained by subtracting Vd from Vdref of step 5 is input into the first proportional integral controller, which outputs a parameter Vdr. A difference obtained by subtracting Vq from Vqref of step 5 is input into the second proportional integral controller, which outputs a parameter Vqr.

A difference is obtained by subtracting Vd from Vdref of step 5, and the other difference is obtained by subtracting Vq from Vqref. The two differences are respectively input to two PI controllers, which respectively output Vdr and Vqr. The PI controllers have the following characteristic that a mathematical relation between the input offset e(t) and an output u(t) is as shown by formula (3):

$$u(t) = K_p \left[ e(t) + \frac{1}{T_i} \int_0^t e(t) dt \right] \quad (3)$$

In formula (3), Kp represents a proportion parameter of the PI controller, and Ti represents an integral parameter. The starting time of the PI controller may be set manually as required.

Step 7: dq-αβ coordinate conversion is performed. The dq-αβ coordinate conversion is performed on the parameters Vdr and Vqr obtained in step 6 to convert two DC components d, q into two synchronously rotating AC components α, β so as to obtain voltages Vα and Vβ at an αβ coordinate system.

The dq-αβ conversion mainly transforms two DC components d, q into two synchronously rotating AC components α, β, and the dq/αβ conversion process meets a mathematical relation as shown by formula (4):

$$\begin{bmatrix} \alpha \\ \beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} a \\ b \\ c \end{bmatrix} \quad (4)$$

The dq-αβ coordinate conversion is performed on the outputs Vdr and Vqr of the two PI controllers to obtain voltages Vα and Vβ at an αβ coordinate system as control signals of a SVPWM generator controlled by space vectors.

Step 8: SVPWM signal modulation is performed. The Vα and Vβ obtained in step 7 are taken as the input signals of the SVPWM generator, and the SVPWM generator generates a PWM control signal for controlling the power switch of the electric grid.

The Vα and Vβ of step 7 are taken as input signals of the SVPWM generator, which employs a conventional two-level and seven-segment mode. The SVPWM generator generates a PWM control signal for controlling the power switch of the electric grid so as to control the on-off of the switch. Therefore, the PCS voltage and frequency control is realized by controlling the on-off time and on-off duration of the switch.

According to the calculation steps, the effectiveness of the method for controlling the voltage and frequency of the LCR-T-type PCS according to the invention is tested by employing a commercially-available simulation software PSCAD and using the test model in FIG. 1. The main parameters of the test model are shown in Table 1.

TABLE 1

Main Parameters Of Test Model

| | |
|---|---|
| DC-side Voltage | 450 V~650 V |
| Converter-Side Inductance L | 2 mH |
| Filter Capacitor C | 30 uF |
| Damping Resistance R | 0.2Ω |
| Transformer T | Δ/Yn, 60 kVA, 0.25/0.4 |
| DC-Side Capacitance Cf | 5000 uF |
| Internal Parameters of PI Controller | P = 0.1, I = 0.0025, [−0.8, 0.8] |
| Starting Time of PI controller | t = 0.01 s |

Three operating conditions are tested respectively.

Operating condition 1: the overall time of simulation is set as 0.1 s, and simulation is carried out by employing a simulation stepsize of 2 us. DC-side voltage Edc=450V. The rated working frequency required by the load is 50 Hz, the effective value of the rated working voltage is 230V, and the peak value is 326V. The load resistance of each phase is set as 10Ω (15.87 kW).

Operating Condition 2: The overall time of simulation is set as 0.1 s, and simulation is carried out by employing a simulation stepsize of 2 us. DC-side voltage Edc=450V. The rated working frequency required by the load is 60 Hz, the effective value of the rated working voltage is 150V, and the peak value is 212V. The load resistance of each phase is set as 3Ω (22.5 kW).

Operating Condition 3: The overall time of simulation is set as 0.5 s, and simulation is carried out by employing a simulation stepsize of 3 us. The DC-side voltage Edc is a pulse DC in the form of a six-pulse wave, which is generated by a three-phase uncontrolled rectifier, with a maximum value of about 565V and a minimum value of about 485V. The rated working frequency required by the load increases by a fixed stepsize of 0.2 Hz/(0.1 s) from 49.5 Hz to 50 Hz and then keeps constant; the peak value of the rated working voltage increases by a fixed stepsize of 15V/(0.1 s) from 250V to 326V and then keeps constant. The load resistance of each phase is set as 5 Ω.

Figure 3:
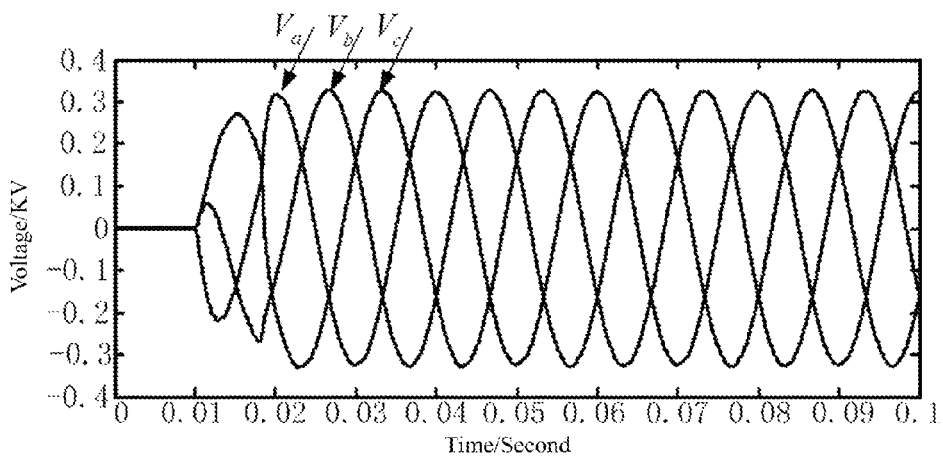
FIG. 3 is a schematic oscillogram showing voltages of three phases A, B, C output by a PCS under operating condition 1 during the testing of the system and method for controlling PCS voltage and frequency according to the invention.
Figure 4:
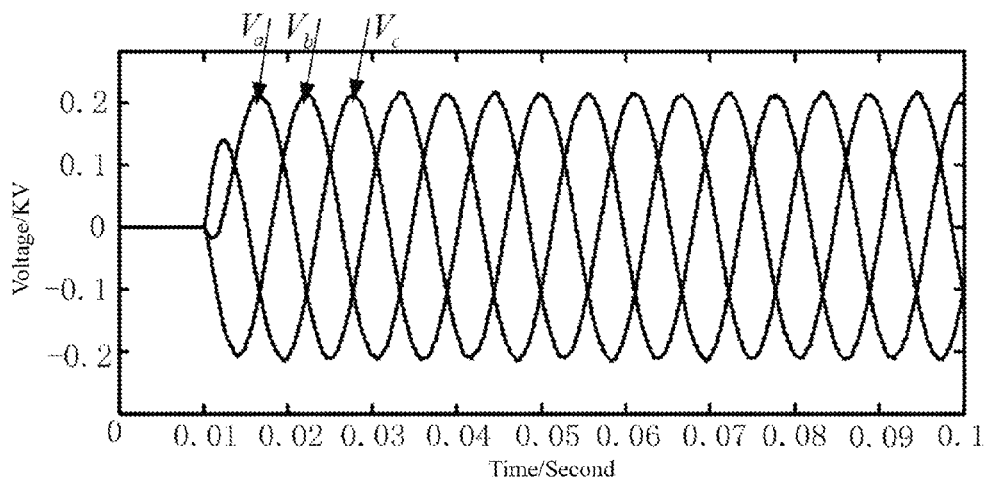
FIG. 4 is a schematic oscillogram showing voltages of three phases A, B, C output by a PCS under operating condition 2 during the testing of the system and method for controlling PCS voltage and frequency according to the invention.
Figure 5:
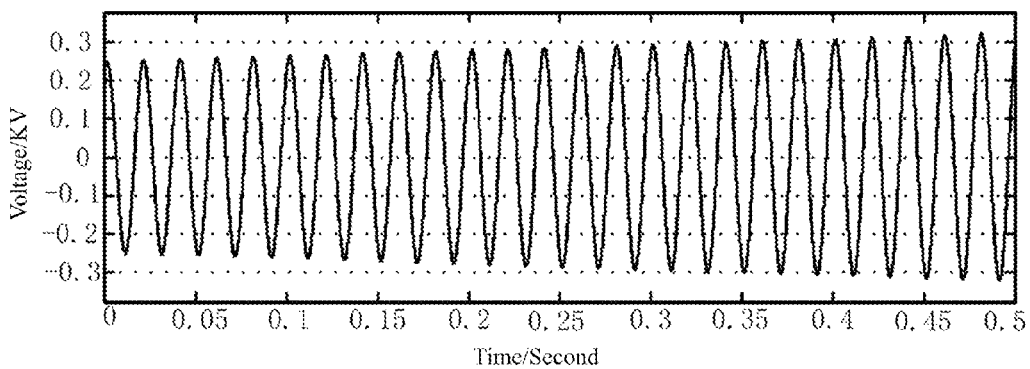
FIG. 5 is a schematic oscillogram showing a voltage of a phase A output by a PCS under operating condition 3 during the testing of the system and method for controlling PCS voltage and frequency according to the invention.

It may be seen from the analysis and comparison of the simulated waveforms in FIG. 3-FIG. 5 that, the LCR-T-type PCS according to the invention can output stably in an off-grid state, and it can track the reference value smoothly in real time even if the DC voltage fluctuates and the expected voltage value changes, thus a high accuracy is achieved.

Figure 6:
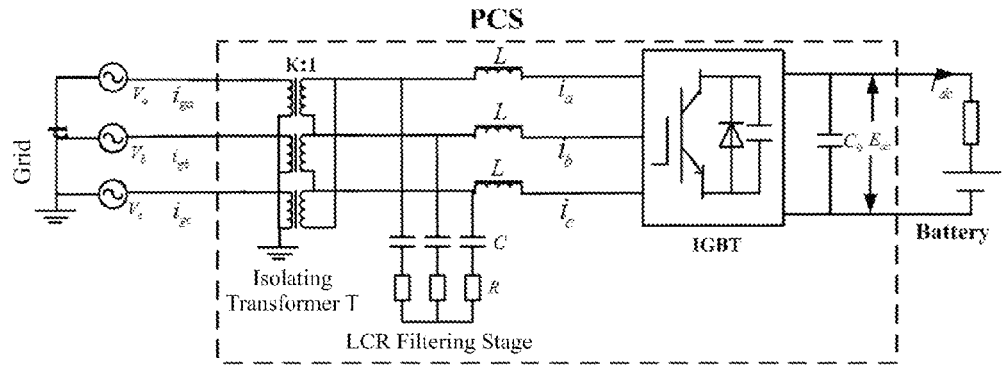
FIG. 6 is a schematic topological diagram of an LCR-type PCS.

As shown in FIG. 6, it is a schematic topological diagram of an LCR-type PCS.

Figure 7:
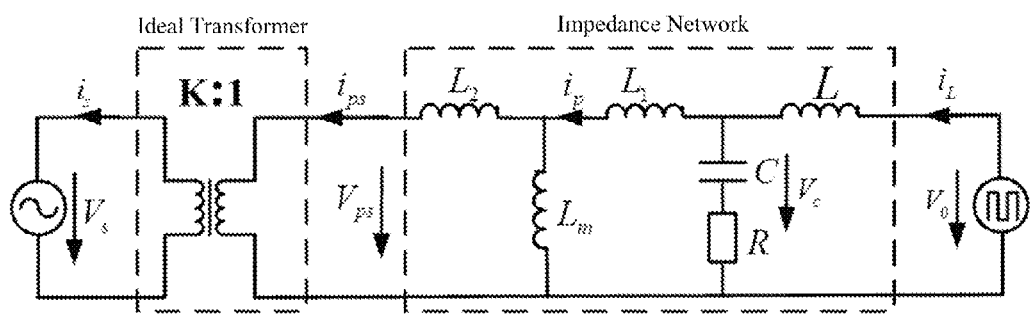
FIG. 7 shows a single-phase equivalent circuit model of an LCR-T-type PCS.

According to FIG. 6, a circuit diagram as shown in FIG. 7 may be obtained by using a T-type equivalent circuit model of a transformer.

It may be known from FIG. 7 that:

$$i_{ps} = K \cdot i_s \quad (01)$$

$$u_{ps} = u_s/K \quad (02)$$

Figure 8:
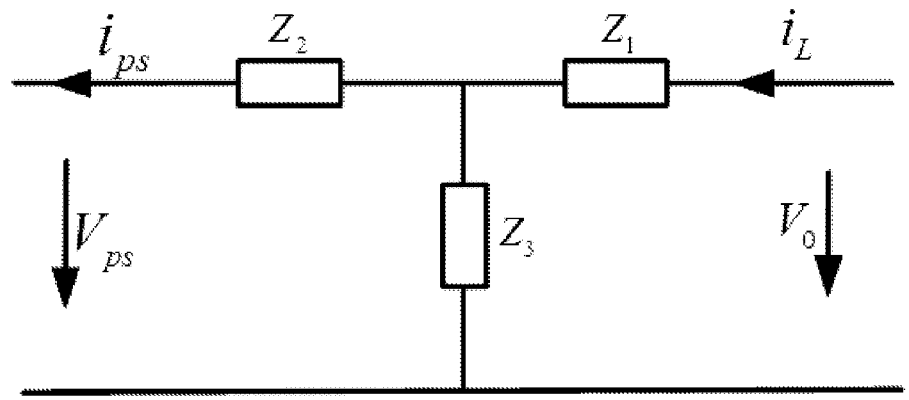
FIG. 8 is a simplified diagram of an impedance network.

It may be seen from FIG. 7 that, for the RC branch in the LC filter, because the fundamental wave impedance meets $1/(\omega C) \gg R$, where $\omega = 2\pi f = 100\pi$ rad/s is the angular frequency of the fundamental wave, and f=50 Hz is the frequency of the fundamental wave. For convenience, the effect of damping resistance will be omitted in the analysis below. The primary inductance $L_1$ of the isolating transformer, the magnetizing inductance $L_m$ and the RC branch of the filter form a triangular ring. The equivalent impedance network shown in FIG. 8 may be obtained by using the triangle/star conversion theory of the impedance network.

Figure 9:
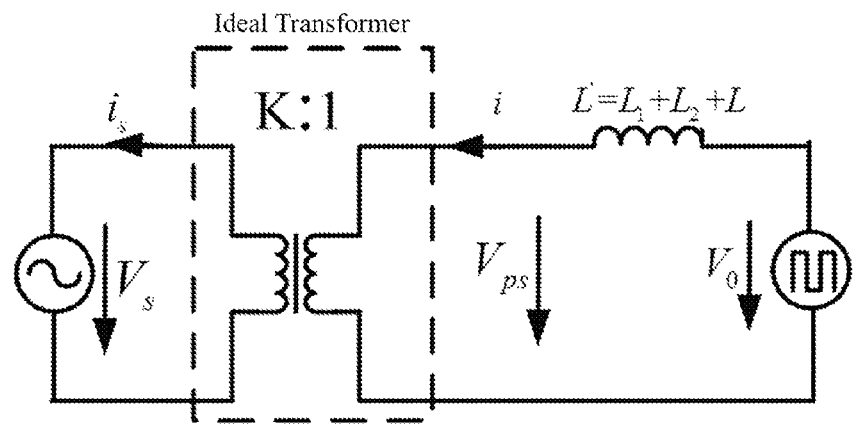
FIG. 9 is a single-phase equivalent circuit model of an LCR-T-type PCS after model reduction.

It may be known from the circuit theory that, the impedances $Z_1$, $Z_2$ and $Z_3$ in FIG. 9 are respectively:

$$Z_1 = sL + \frac{sL_1 \frac{1}{sC}}{sL_1 + sL_m + \frac{1}{sC}} = sL + \frac{sL_1}{s^2(L_1C + L_mC) + 1} \quad (03)$$

$$Z_2 = sL_2 + \frac{sL_1 sL_m}{sL_1 + sL_m + \frac{1}{sC}} = sL_2 + \frac{s^3 L_1 L_m C}{s^2(L_1C + L_mC) + 1} \quad (04)$$

$$Z_3 = \frac{sL_m \frac{1}{sC}}{sL_1 + sL_m + \frac{1}{sC}} = \frac{sL_m}{s^2(L_1C + L_mC) + 1} \quad (05)$$

By applying the superposition principle in the circuit theory, it may be obtained that the transfer function between the voltage $V_O$ output by the PCS and each of the currents $i_{ps}$, $i_L$ are respectively:

$$G_{V_0 \to i_{ps}} = \frac{1}{Z_1 + Z_2 // Z_3} \cdot \frac{Z_3}{Z_2 + Z_3} = \frac{Z_3}{Z_1 Z_2 + Z_1 Z_3 + Z_2 Z_3} \quad (06)$$

$$G_{V_0 \to i_L} = \frac{1}{Z_1 + Z_2 // Z_3} = \frac{Z_2 + Z_3}{Z_1 Z_2 + Z_1 Z_3 + Z_2 Z_3} \quad (07)$$

Current i is customized:

$$i = \alpha i_{ps} + (1-\alpha) i_L \quad (08)$$

where $\alpha \in [0,1]$;

The transfer function between the voltage $V_O$ input to the impedance network and the current i is:

$$G_{V_0 \to i} = \alpha G_{V_0 \to i_{ps}} + (1-\alpha) G_{V_0 \to i_L} = \frac{(1-\alpha)Z_2 + Z_3}{Z_1 Z_2 + Z_1 Z_3 + Z_2 Z_3} \quad (09)$$

When substituted by formula (03)-formula (05), formula (09) may be simplified as:

$$G_{V_0 \to i} = \frac{(1-\alpha)s^2(L_1 L_2 + L_2 L_m + L_1 L_m)C + [(1-\alpha)L_2 + L_m]}{s(L_1 + L_m)C + 1} \quad (010)$$

$$\frac{s^2(L_1 + L_m)C + 1}{s^2(a+b)}$$

where $$a = s^2(LL_1 L_m + LL_1 L_2 + LL_2 L_m)C$$

$$b = L_2 L_m + LL_m + L_1 L_m + LL_2 + L_1 L_2$$

Let:

$$\alpha = \frac{L_2 L_m + L_1 L_m + L_1 L_2}{L_2 L_m + LL_m + L_1 L_m + LL_2 + L_1 L_2} \quad (011)$$

Then, formula (010) may be simplified as:

$$G_{V_0 \to i} = \frac{L_m + (1-\alpha)L_2}{sb} \quad (012)$$

Because the magnetizing inductance of the transformer is much larger than the primary and secondary inductance, that is, $L_1 \approx L_2 \ll L_m$, then, approximately:

$$\alpha = \frac{L_2 + L_1}{L_2 + L_1 + L} \quad (013)$$

Formula (12) may be further simplified as:

$$G_{V_0 \to i} = \frac{1}{s(L_1 + L_2 + L)} \quad (014)$$

Similarly, the transfer function between the secondary voltage $V_{ps}$ of the isolating transformer and the current $i_{ps}$, $i_L$ are respectively:

$$G_{V_{ps} \to i_{ps}} = -\frac{1}{Z_2 + Z_1 // Z_3} = -\frac{Z_1 + Z_3}{Z_1 Z_2 + Z_1 Z_3 + Z_2 Z_3} \quad (015)$$

$$G_{V_{ps} \to i_L} = -\frac{1}{Z_2 + Z_1 // Z_3} \frac{Z_3}{Z_1 + Z_3} = -\frac{Z_3}{Z_1 Z_2 + Z_1 Z_3 + Z_2 Z_3} \quad (016)$$

It may be known from formula (015) and formula (016) that the transfer function between $V_{ps}$ and current i is:

$$G_{V_{ps} \to i} = \alpha G_{V_{ps} \to i_{ps}} + (1-\alpha) G_{V_{ps} \to i_L} = -\frac{\alpha Z_1 + Z_3}{Z_1 Z_2 + Z_1 Z_3 + Z_2 Z_3} \quad (017)$$

When substituted by formula (03)-formula (05), formula (017) may be simplified as:

$$G_{V_{ps} \to i} = \frac{\alpha s^2 (L_1 + L_m)C + [\alpha(L_1 + L) + L_m]}{s(L_1 + L_m)C + 1} \frac{s^2(L_1 + L_m)C + 1}{s^2(a+b)} \quad (018)$$

Similarly, when $L_1 \approx L_2 \ll L_m$, formula (018) may be simplified by formula (013) as:

$$G_{V_{ps} \to i} = -\frac{1}{s(L_1 + L_2 + L)} \quad (019)$$

Formula (06) and formula (015) respectively give the transfer function $G_{V_0 \to i_{ps}}$ between the output voltage $V_0$ of the LCR-T-type PCS and current $i_{ps}$ and the transfer function $G_{V_{ps} \to i_{ps}}$ between the voltage $V_{ps}$ of the isolating transformer and current $i_{ps}$, that is, this is an original system model without model reduction. It can be easily found that this is a 5-ordered system and the order of the model is high, thus it is difficult to be controlled.

Figure 10:
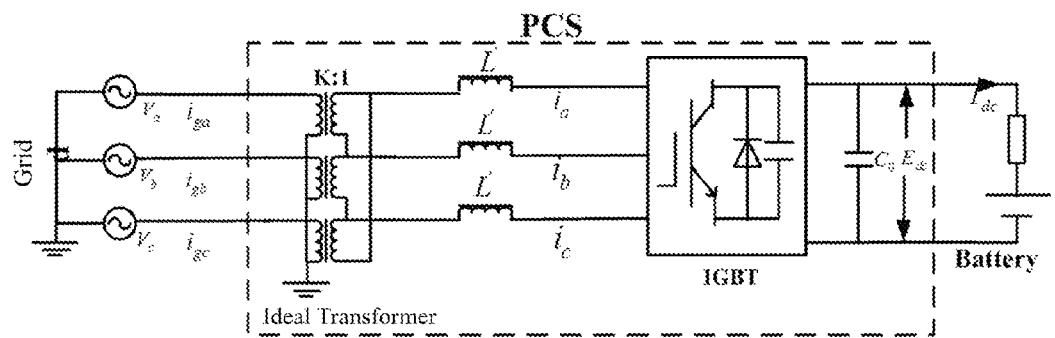
FIG. 10 is a schematic topological diagram of an LCR-type PCS after model reduction.

In comparison with formula (014) and formula (019), it may be found that the order of the system model after model reduction is 1, and it is determined only by the inductance parameters of the filter and the isolating transformer. For such a simple system, the design of its controller is easier than the original system, and the control effect will not be influenced. FIG. 9 and FIG. 10 respectively show a single-phase equivalent circuit diagram of an LCR-T-type PCS after simplification and a topological diagram of the overall system.

The mathematical nature of model reduction is to carry out a pole-zero cancellation on the transfer function of the LCR-T-type PCS, and the physical nature is to omit the filter capacitor branch and the magnetizing inductance branch and to replace the impedance network shown in FIG. 7 by the equivalent inductance L' so as to lower the control difficulty and realize good control effect.

What is claimed is:

1. A system for controlling a Power Conversion System (PCS) voltage and frequency, comprising:
    a reference voltage converter;
    a phase-locked loop;
    a grid-side voltage converter;
    a voltage transformer;
    a first proportional integral controller;
    a second proportional integral controller;
    a coordinate converter; and
    a space vector pulse width modulation (SVPWM) generator;
    wherein the reference voltage converter is connected to an output terminal of the phase-locked loop, and the output terminal of the phase-locked loop is further connected to the grid-side voltage converter;
    wherein the grid-side voltage converter is connected to a high-voltage side of an isolating transformer of an electric grid via the voltage transformer;
    wherein two output terminals of the grid-side voltage converter are connected to the coordinate converter via the first proportional integral controller and the second proportional integral controller respectively;
    wherein an output terminal of the reference voltage converter is connected between the grid-side voltage converter and the first proportional integral controller, and the other output terminal of the reference voltage converter is connected between the grid-side voltage converter and the second proportional integral controller;
    wherein an output terminal of the coordinate converter is connected to the SVPWM generator; and
    wherein an output terminal of the SVPWM generator is connected to a power switch of the electric grid.

2. A method for controlling PCS voltage and frequency, comprising:
    performing a model reduction;
    generating expected three-phase voltages Varef, Vbref and Vcref as reference voltages;
    collecting three-phase voltages Va, Vb and Vc at a high-voltage side of an isolating transformer T of an electric grid in real time;
    acquiring a phase θ of the reference voltage;
    performing coordinate conversion on Varef, Vbref, Vcref and Va, Vb, Vc, and converting AC components a, b and c into DC components d and q to obtain a d-axis component Vdref and a q-axis component Vqref of the reference voltage and a d-axis component Vd and a q-axis component Vq of a sampled voltage;
    controlling an outer loop voltage;
    inputting a difference obtained by subtracting a Vd value from a Vdref value into a first proportional integral controller, which outputs a parameter Vdr;

inputting a difference obtained by subtracting a Vq value from a Vqref value into a second proportional integral controller, which outputs a parameter Vqr;

performing dq-$\alpha\beta$ coordinate conversion;

performing dq-$\alpha\beta$ coordinate conversion on the parameters Vdr and Vqr and converting the two DC components d, q into two synchronously rotating AC components $\alpha$, $\beta$ to obtain voltages V$\alpha$ and V$\beta$ at an $\alpha\beta$ coordinate system;

performing SVPWM signal modulation;

generating a pulse width modulation (PWM) control signal using a V$\alpha$ and a V$\beta$ as input signals of an SVPWM generator; and generating a PWM control signal for controlling a power switch of the electric grid by the SVPWM generator.

* * * * *